No. 732,808. PATENTED JULY 7, 1903.
W. H. YEAGER & E. R. RIXSTINE.
FIRE ESCAPE.
APPLICATION FILED SEPT. 23, 1902.
NO MODEL.

Witnesses
Chas. F. Clagett
F. O. McCleary

Inventors
Wm. H. Yeager
E. R. Rixstine
By their Attorneys

No. 732,808. Patented July 7, 1903.

UNITED STATES PATENT OFFICE.

WILLIAM H. YEAGER AND ELMER R. RIXSTINE, OF ALLENTOWN, PENNSYLVANIA.

FIRE-ESCAPE.

SPECIFICATION forming part of Letters Patent No. 732,808, dated July 7, 1903.

Application filed September 23, 1902. Serial No. 124,527. (No model.)

*To all whom it may concern:*

Be it known that we, WILLIAM H. YEAGER and ELMER R. RIXSTINE, both citizens of the United States, residing at Allentown, in the county of Lehigh and State of Pennsylvania, have invented certain new and useful Improvements in Fire-Escapes, of which the following is a specification.

This invention relates to fire-escapes; and its primary object is to provide simple, inexpensive, and effective means for rescuing the occupants of a building in case of fire and conveying them safely to the ground from any floor of the building.

A further object of the invention is to avoid the use of the cumbersome and unsightly stationary platforms and ladders now commonly used as fire-escapes and also the use of belts to be attached to the person of the user and friction devices adapted to slide upon suspended ropes, as fire-escapes of the latter type are both dangerous and difficult to manipulate.

The present invention comprises parallel rods secured in an inclined or diagonal position to a building and serving as a trackway, in combination with a cage guided on the rods and means for controlling the movement of the cage and for retracting it to its normal elevated position.

The construction of the improvement will be fully described hereinafter in connection with the accompanying drawings, which form part of this specification, and its novel features will be defined in the appended claims.

Figure 1:
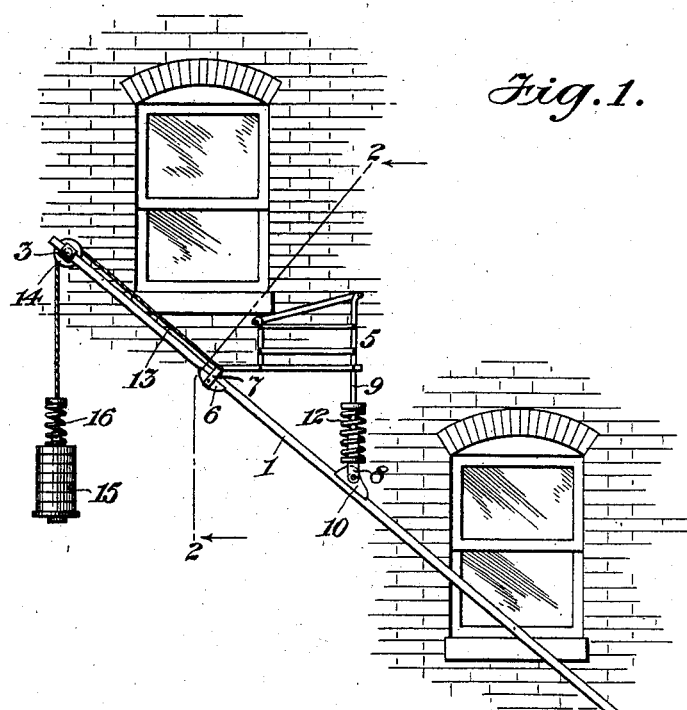
Figure 2:
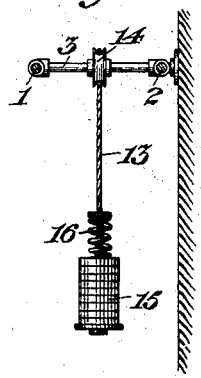
Figure 3:
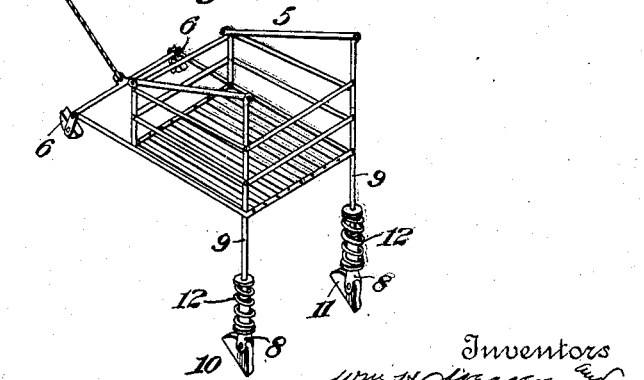

In the drawings, Figure 1 is a front elevation of the improvement in position upon a building. Fig. 2 is a section on the line 2 2 of Fig. 1, and Fig. 3 is a view in perspective of the cage removed from the track.

Corresponding parts in all the figures are denoted by the same reference characters.

The reference-numerals 1 and 2 designate parallel rods secured at their upper ends to the upper portion of a building by means of a rod 3 and at their lower ends to a point on the building near the ground by a rod 4. The rods 1 and 2 are thus supported in an inclined or diagonal position, as shown, to serve as a trackway for a cage 5, supported at its upper end upon friction-shoes 6, adapted to travel upon the inclined trackway and provided with guard-arms 7, extending under the rods 1 and 2 to prevent the cage from leaving the track. The lower end of the cage is provided with shoes 8, adapted to slide on the track and having stems or shanks 9 of sufficient length to raise the lower end of the cage well above the trackway.

10 and 11 designate brake-shoes suspended below the cage, near the lower end thereof, by spiral springs 12, so that the pressure of the brake-shoes upon the rods 1 and 2 will be proportioned to the weight of the load carried by the cage.

A rope or cable 13, secured at one end to the upper end of the cage or car, passes over a pulley 14, mounted on the rod 3. To the opposite end of said rope or cable is attached a weight 15, which serves to automatically return the cage or car to its elevated position after it is relieved of its load. A cushioning coil-spring 16 surrounds the rope 13 adjacent to the weight to prevent shock or jar when the weight strikes against the rod 3, and similar springs 17 are provided at the lower ends of the track-rods 1 and 2 to cushion the cage or car when it reaches its lowest point.

In addition to the spring brake mechanism above referred to any suitable hand-operated brake may be employed upon the cage to regulate the velocity of the descent of the cage.

It will be apparent that the improvement constructed as above described affords a safe and reliable means of escape from all of the floors of a building to which it may be applied and that in addition to the accessibility of the car or cage from a point opposite each floor the descent of the car may be readily controlled to insure safety to its occupants.

We would have it understood that the invention is not restricted to all of the details shown in the drawings, but includes also all such changes and modifications in construction as may fall within the scope of the invention as defined and set forth in the following claims.

Having thus described our invention, we claim and desire to secure by Letters Patent—

1. The combination with a building structure, of a fire-escape comprising parallel inclined rods or rails secured to the building to constitute a trackway, a cage or car adapted to travel on said trackway, and automatic brake devices connected with said cage or car, consisting of shoes underneath and connected to the car or cage, contacting with the rails, with intermediately-disposed springs whereby the brakes may vary in their retarding influence with the weight of the load thereupon, substantially as set forth.

2. The combination with a building structure, of a fire-escape comprising supports secured to the building, rods or rails extending between said supports in an inclined or diagonal position close to a wall and the openings therein, a cage or car adapted to travel on said rods or rails, a pulley mounted on the upper support, a rope secured to the cage or car and passing over said pulley, a weight attached to the extremity of said rope, and automatic brake mechanism consisting of shoes underneath and connected to the car or cage, contacting with the rails, with intermediately-disposed springs whereby the brakes may vary in their retarding influence according to the weight carried thereby, substantially as set forth.

3. The combination with a building structure, of a fire-escape comprising supports secured to the building, rods or rails extending between said supports in an inclined or diagonal position close to a wall and the openings therein, a cage or car adapted to travel on said rods or rails, a pulley mounted on the upper support, a rope secured to the cage or car and passing over said pulley, a weight attached to the extremity of said rope, automatic brake mechanism carried by the car consisting of shoes in pivotal connection with the front of the car, bearing upon the under sides of the rails and having guard-arms to hold same thereon, and shoes underneath the rear of the car having spring connections therewith and bearing upon the upper sides of the rails, whereby they may vary in their retarding influence according to the weight carried thereby, and devices for cushioning the cage or car at the upper and lower ends of the trackway, substantially as set forth.

In testimony whereof we have signed our names in the presence of the subscribing witnesses.

WILLIAM H. YEAGER.
ELMER R. RIXSTINE.

Witnesses:
E. F. OCHS,
R. A. B. HAUSMAN.